United States Patent
Strauchmann et al.

(10) Patent No.: US 11,858,053 B2
(45) Date of Patent: Jan. 2, 2024

(54) CUTTING TOOL

(71) Applicant: Kennametal Inc., Latrobe, PA (US)

(72) Inventors: Christian Strauchmann, Eggolsheim (DE); Jürgen Schwägerl, Vohenstrauss (DE); Herbert Rudolf Kauper, Erlangen (DE)

(73) Assignee: KENNAMETAL INC., Latrobe, PA (US)

( * ) Notice: Subject to any disclaimer, the term of this patent is extended or adjusted under 35 U.S.C. 154(b) by 0 days.

(21) Appl. No.: 17/031,050

(22) Filed: Sep. 24, 2020

(65) Prior Publication Data

US 2021/0094106 A1  Apr. 1, 2021

(30) Foreign Application Priority Data

Sep. 26, 2019  (DE) .......................... 102019126051.5

(51) Int. Cl.
  *B23B 51/02*  (2006.01)
(52) U.S. Cl.
  CPC .......... *B23B 51/02* (2013.01); *B23B 2251/04* (2013.01); *B23B 2251/40* (2013.01); *B23B 2260/0725* (2013.01)
(58) Field of Classification Search
  CPC . B23B 51/02; B23B 2251/08; B23B 2251/12; B23B 2251/14; B23B 2251/04; B23B 2251/047; B23B 2251/048; B23B 2251/446
  See application file for complete search history.

(56) References Cited

U.S. PATENT DOCUMENTS

| | | | |
|---|---|---|---|
| 4,714,383 A | | 12/1987 | Shimomura et al. |
| 7,137,461 B2* | | 11/2006 | Meierhofer ............ B23B 51/00 |
| | | | 175/323 |
| 7,530,772 B2* | | 5/2009 | Reinhardt ............... B23B 51/02 |
| | | | 408/230 |
| 7,861,807 B2* | | 1/2011 | Probst .................... B28D 1/146 |
| | | | 175/420 |
| 9,440,296 B2* | | 9/2016 | Hufschmied ............ B23C 5/10 |
| 9,975,183 B2* | | 5/2018 | Harif ........................ B23C 5/06 |
| 10,058,934 B2 | | 8/2018 | Burton et al. |
| 10,207,342 B2* | | 2/2019 | Mura ...................... B23C 5/109 |
| 10,300,534 B2* | | 5/2019 | Kawakami ............. B23B 51/00 |
| 2003/0000745 A1* | | 1/2003 | Huber .................... B23B 51/02 |
| | | | 175/427 |
| 2003/0180104 A1* | | 9/2003 | Kuroda .................... B23C 5/10 |
| | | | 407/54 |

(Continued)

FOREIGN PATENT DOCUMENTS

| | | |
|---|---|---|
| CN | 101282806 A | 10/2008 |
| CN | 101821044 A | 9/2010 |

(Continued)

OTHER PUBLICATIONS

Apr. 14, 2023 Foreign Office Action Chinese Application No. CN202010816529.6, 15 Pages.

(Continued)

*Primary Examiner* — Alan Snyder
*Assistant Examiner* — Reinaldo A Vargas Del Rio
(74) *Attorney, Agent, or Firm* — Christopher J. Owens

(57) ABSTRACT

Cutting tool for the rotary machining of workpieces, in particular a twist drill, with a cutting tip which has at least one main cutting edge and at least one free surface (24), wherein a flank face adjoins the main cutting edge radially to the outside, and wherein a flank angle of the flank face increases in a radially outward direction.

7 Claims, 4 Drawing Sheets

(56) References Cited

U.S. PATENT DOCUMENTS

| | | |
|---|---|---|
| 2010/0135741 A1 | 6/2010 | Probst et al. |
| 2011/0170974 A1 | 7/2011 | Masuda |
| 2013/0051937 A1 | 2/2013 | Sharivker |
| 2014/0133926 A1 | 5/2014 | Budda et al. |
| 2015/0209877 A1 | 7/2015 | Hufschmied |
| 2015/0367427 A1 | 12/2015 | Burton et al. |
| 2016/0052069 A1* | 2/2016 | Kauper ............... B23B 51/02 408/144 |
| 2016/0214186 A1 | 7/2016 | Mura et al. |
| 2017/0066062 A1* | 3/2017 | Takahashi ............ B23B 51/02 |
| 2021/0031277 A1* | 2/2021 | Watanabe ........... B23B 51/009 |

FOREIGN PATENT DOCUMENTS

| | | | |
|---|---|---|---|
| CN | 101970158 A | | 2/2011 |
| CN | 104907611 A | | 9/2015 |
| CN | 106238783 A | | 12/2016 |
| CN | 106457422 A | | 2/2017 |
| CN | 106925820 A | | 7/2017 |
| CN | 107414149 A | * | 12/2017 |
| CN | 107984005 A | * | 5/2018 |
| CN | 108698141 A | | 10/2018 |
| DE | 102009035625 | | 2/2011 |
| DE | 102015210817 A1 | | 12/2016 |
| DE | 102016221363 A1 | | 3/2018 |
| EP | 3150313 A1 | | 4/2017 |
| JP | S57102711 A | | 6/1982 |

OTHER PUBLICATIONS

Nov. 7, 2023 Foreign Office Action Chinese Application No. CN202010816529, 9 Pages.

* cited by examiner

A-A

B-B

C-C

D-D

CUTTING TOOL

RELATED APPLICATION DATA

The present application claims priority pursuant to 35 U.S.C. § 119(a) to German Patent Application Number 102019126051.5 filed Sep. 26, 2019, which is incorporated herein by reference in its entirety.

FIELD

The invention relates to a cutting tool for the rotary machining of workpieces, in particular a twist drill.

BACKGROUND

Cutting tools for the rotary machining of workpieces are often subject to high wear, especially when the machined workpieces are made of a particularly hard material such as steel.

In rotating cutting tools with a frontal cutting edge, the greatest wear occurs in the area of a radially outer cutting corner, because the relative speed, and consequently the friction and the stresses in the material, are greatest in this area.

Once wear has started in the area of the cutting corner, the stresses and friction increase even more due to the increased surface roughness caused by the wear that has occurred. In addition, the strength of the cutting tool decreases due to wear, so that parts can break out of the cutting tool when machining a workpiece. The quality of a bore produced with the cutting tool is then no longer adequate, and the cutting tool has to be replaced.

SUMMARY

It is therefore an object of the invention to provide a cutting tool for the rotary machining of workpieces that has a particularly long service life.

This object is achieved according to the invention with a cutting tool for the rotary machining of workpieces, in particular a twist drill, with a cutting tip which has at least one main cutting edge and at least one free surface, wherein a flank face adjoins the main cutting edge radially to the outside, and wherein a flank angle of the flank face increases in a radially outward direction. The flank angle in particular increases from the main cutting edge to a cutting corner.

The flank face is in particular a secondary free surface.

In conventional rotating cutting tools, wear is greatest on the cutting corner as this is where the greatest amount of friction occurs. Due to the increasing flank angle of the flank face, the cutting tool according to the invention has more clearance in a radially outer area, in particular in the area of the cutting corner. There is consequently less wear, because the friction during the machining of a workpiece is reduced in comparison to conventional cutting tools. The friction is in particular reduced in an area behind the cutting corner in the direction of rotation.

The flank angle preferably increases from a center of the cutting tool, in particular from a cutting tip, to the cutting corner.

Since the flank face slopes away radially outward, for example, the flank angle can also increase viewed in axial direction, in particular from the cutting tip.

The flank angle is, for example, viewed in a section perpendicular or approximately perpendicular to the longitudinal axis of the cutting tool. The flank angle is smaller in a sectional plane that is closer to a cutting tip than in a sectional plane that is further away from the cutting tip.

For example, the flank angle is measured in the sectional plane relative to a perpendicular that extends perpendicular to a surface of the flute at the transition from a flute to the flank face.

Since the flank angle increases from the inside radially outward, the cutting tool is also sufficiently stable in the area of the main cutting edge, because there is enough material in the area of the main cutting edge.

The flank angle preferably increases continuously. As a result, the cutting tool and/or the flank angle can be produced particularly easily and dimensionally accurately.

According to one embodiment, measured in a section perpendicular to the main cutting edge, the flank angle increases toward the cutting corner, in particular from radially inside to radially outside. The flank angle measured in a section perpendicular to the main cutting edge is also referred to as an effective flank angle.

The flank angle increases by at least 2°, for example, in particular at least 4°, for example from 8° to 12°. By increasing the flank angle in this way, sufficient clearance of the cutting tool is achieved in the area of the cutting corner without negatively affecting the stability of the cutting tool.

According to one embodiment, the main cutting edge merges into an edge of the flank face, whereby the flank angle increases along the edge. This means that the increasing flank angle of the main cutting edge provides more clearance in a radially outer area.

The edge of the flank face can be straight or curved.

According to one embodiment, the cutting tool comprises at least one guide bevel, which extends along a flute and opens into the flank face. The guide bevels are used to machine the lateral surfaces of the bore and to guide the cutting tool in the bore.

The cutting tool can also comprise a back-milling, adjacent to the free surface, which opens into the flank face. This can be regarded as a further secondary free surface, in addition to the flank face, and is also referred to as the back. The back-milling forms the transition from the frontal main free surface to the outer surface of the cutting tool. The back-milling can prevent the cutting tool from getting stuck in the workpiece during machining.

In a plan view onto the flank face, the flank face is approximately L-shaped. Such a shape of the flank face is particularly advantageous with respect to reducing friction when machining a workpiece.

According to a further embodiment, the corner radius is not tangent to the periphery and/or the free surface. The corner radius is in particular not tangent to any of the adjacent surfaces. This also helps to reduce wear in the area of the cutting corner.

BRIEF DESCRIPTION OF THE DRAWINGS

Further advantages and features of the invention result from the following description and from the accompanying drawings, to which reference is made. The drawings show.

DETAILED DESCRIPTION

Figure 1:
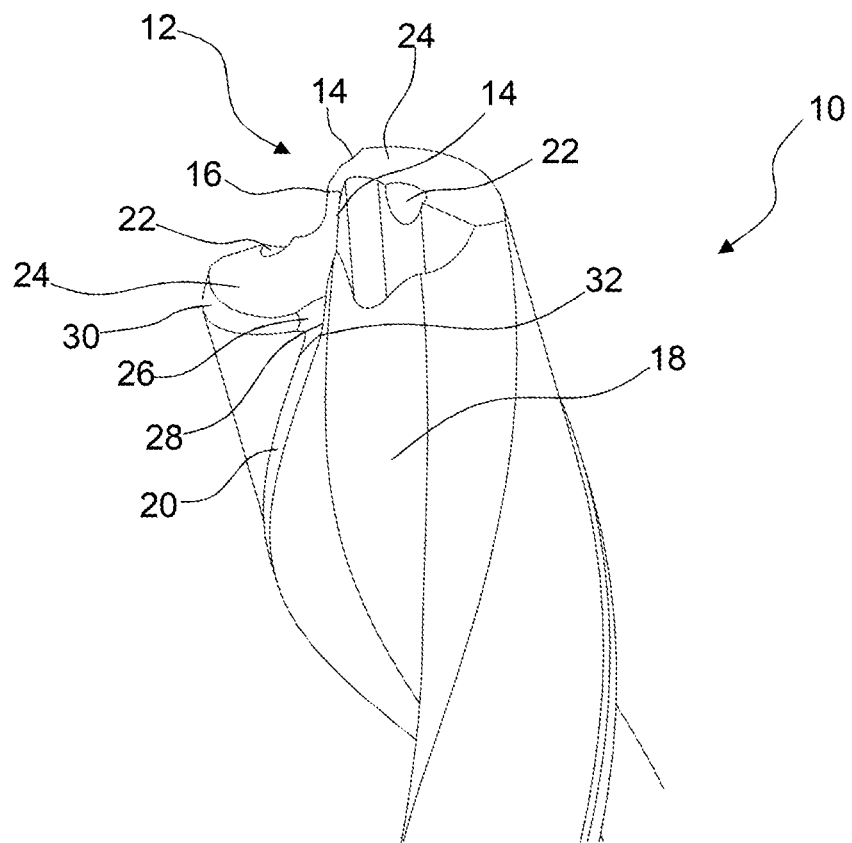
FIG. 1 a cutting tool according to the invention.

FIG. 1 shows a portion of a cutting tool 10 according to the invention in a perspective view. The cutting tool 10 is suitable for the rotational machining of workpieces made of metal. More specifically, the cutting tool 10 is a twist drill.

The cutting tool 10 has a cutting tip 12 with two main cutting edges 14, which in particular extend parallel to one another.

The cutting tool 10 also has a chisel edge 16, which connects the main cutting edges 14.

When machining a workpiece, the main cutting edges 14 take over the actual drilling process and cut the material of a machined workpiece. The chisel edge 16 has a scraping effect and increases the required working pressure on the cutting tool 10.

The cutting tool 10 also comprises two flutes 18 for evacuating metal chips away from the cutting tip 12.

The cutting tool 10 further comprises two guide bevels 20. The guide bevels 20 are used to guide the cutting tool 10 when machining a workpiece in a produced bore. The guide bevels 20 in particular serve to improve a concentricity of the cutting tool 10.

In addition, the cutting tool 10 comprises two cooling channels 22, to transport coolant to the cutting tip 12 or to the main cutting edge 14.

Adjacent to the main cutting edge 14, the cutting tool 10 has a free surface 24, which is also referred to as the main free surface.

There is also a flank face 26, which adjoins the main cutting edge 14 radially to the outside and can be regarded as a secondary free surface.

The main cutting edge 14 thereby merges into an edge 28 of the flank face 26, in particular into an edge 28 which, viewed in the direction of rotation of the cutting tool 10, is located in the front. This edge 28 can be curved, in particular curved convexly.

In addition to the main cutting edge 14, the guide bevel 20 and a back-milling 30 extend into the flank face 26 as well.

As can be seen in FIG. 1, the flank face 26 is at least approximately L-shaped.

Starting from the main cutting edge 14, a flank angle of the flank face 26 increases in a radially outward direction. More specifically, the flank angle increases along the edge 28. In other words, the flank angle 26 increases in the direction toward a cutting corner 32. The cutting tool 10 consequently has more clearance when machining a workpiece, which reduces the wear on the cutting tool 10 and extends the service life of the cutting tool 10.

The flank angle in particular increases continuously.

Figure 2:
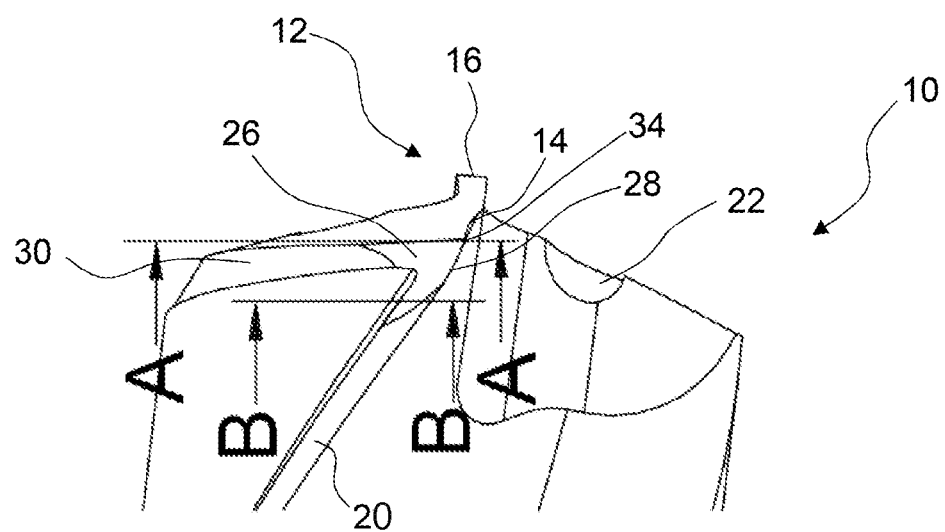
FIG. 2 an enlarged view of the cutting tool of FIG. 1 in the area of a cutting tip, FIG. 3 a section through the cutting tool along the Line A-A in FIG. 2, FIG. 4 a section through the cutting tool along the Line B-B in FIG. 2, FIG. 5 a partial view of the cutting tool in the area of the flank face, FIG. 6 a partial view of the cutting tool in the area of the main cutting edge, FIG. 7 a section through the cutting tool along the Line C-C in FIG. 6, and FIG. 8 a section through the cutting tool along the Line D-D in FIG. 6.

FIG. 2 additionally shows the cutting tool 10 of FIG. 1 in a lateral view.

Figure 3:
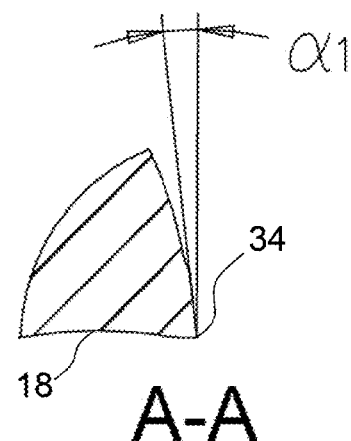
Figure 4:
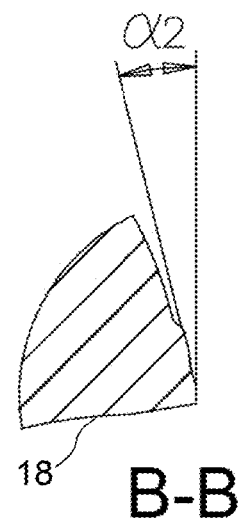

The alignment of the flank face 26 is explained in more detail with the aid of FIGS. 3 and 4.

FIG. 3 shows a partial section through the cutting tool 10 along the Line A-A of FIG. 2. The section A-A extends through an end point 34 of the edge 28, which is closest to the cutting tip 12.

FIG. 4 shows a partial section through the cutting tool 10 along the Line B-B of FIG. 2. Section B-B extends through the flank face 26 below the edge 28.

A comparison of FIGS. 3 and 4 shows that, starting from an end point 34 of the edge 28, the flank angle increases from a value $\alpha_1$ to a value $\alpha_2$.

The flank angle increases at least 2°, for example, in particular at least 4°, for example from 8° to 12°.

The sectional plane in which the flank angle is measured is perpendicular or approximately perpendicular to the longitudinal axis of the cutting tool 10.

The flank angle is measured in the sectional plane relative to a perpendicular that extends perpendicular to a surface of the flute 18 at the transition from the flute 18 to the flank face 26 or the guide bevel 20.

Figure 5:
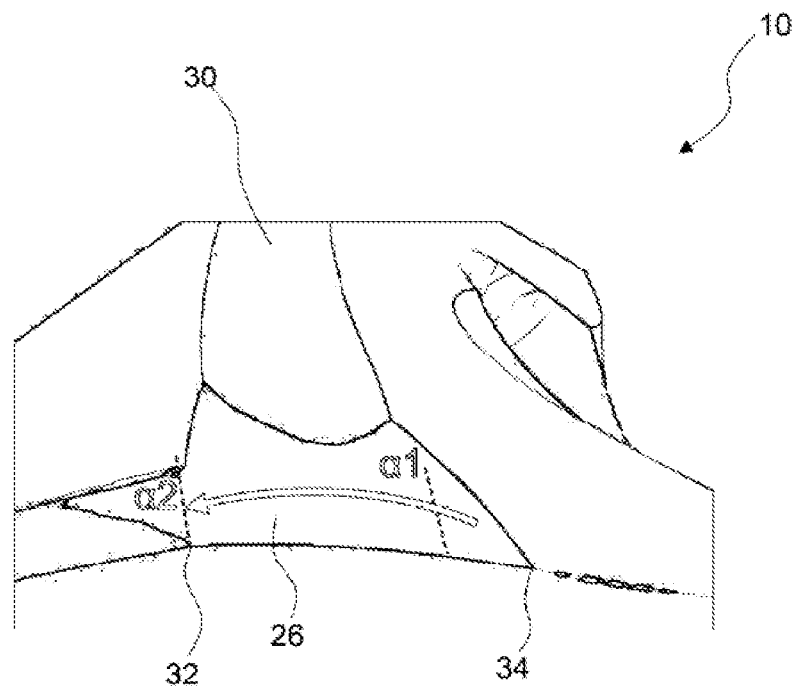

FIG. 5 additionally shows a further partial view of the cutting tool in the area of the flank face 26. This view illustrates the increase of the flank angle from a value $\alpha1$ to a value $\alpha2$.

Since the flank face 26 slopes away radially outward, the flank angle does not only increase when viewed in radial direction, but also when viewed in axial direction.

A corner radius, which extends between the cutting corner 32 and the end point 34, is preferably not tangent to the periphery and to the free surface 24.

Figure 6:
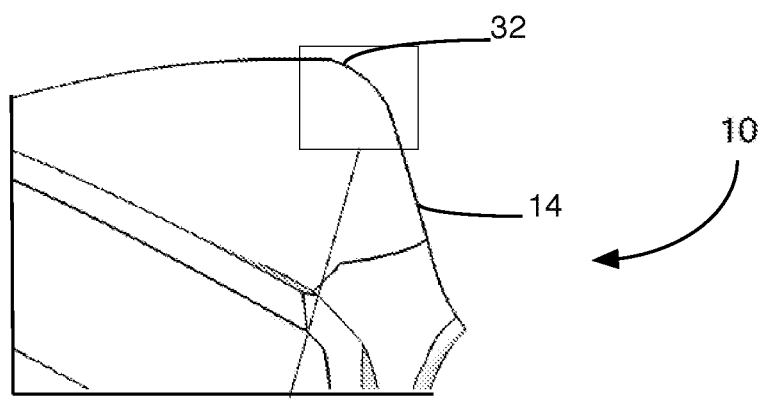
Figure 6:
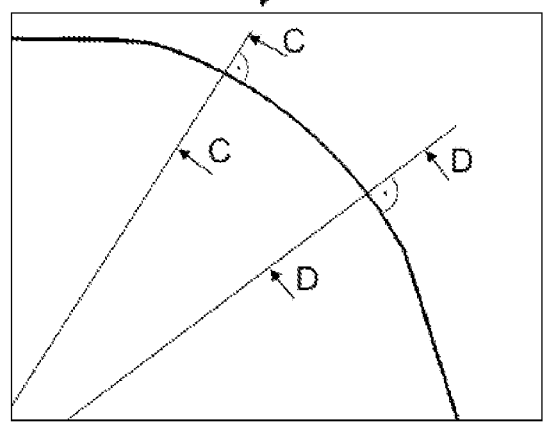
Figure 7:
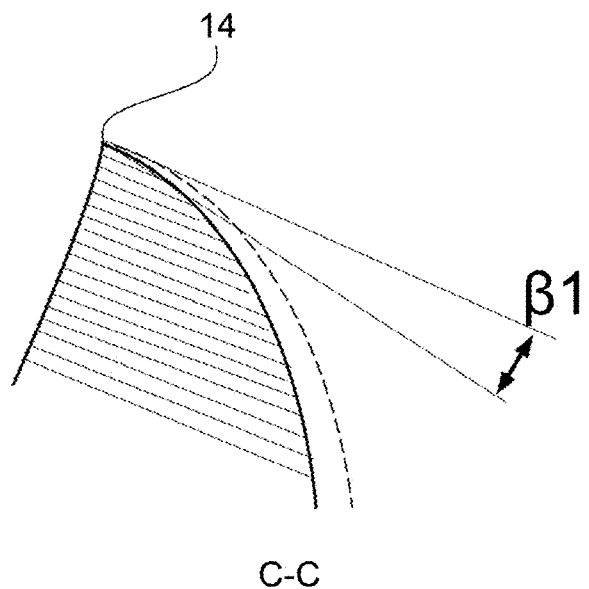
Figure 8:
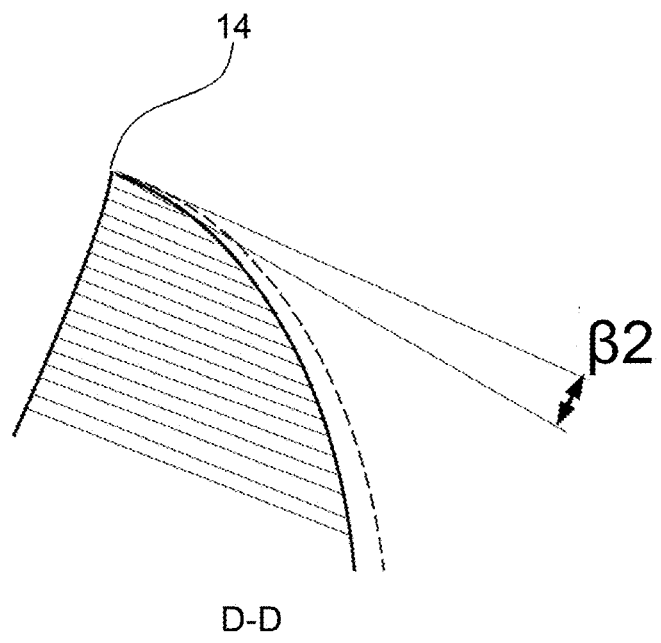

FIGS. 6 to 8 illustrate the effective flank angle, which is measured in a section perpendicular to the main cutting edge 14.

FIG. 6 shows a partial view of the cutting tool 10 in the area of the main cutting edge 14.

FIGS. 7 and 8 respectively show a section perpendicular to the main cutting edge 14 along the Line C-C or D-D in FIG. 6.

The flank angle can also be measured in the section perpendicular to the main cutting edge 14, whereby, here too, the flank angle increases along the main cutting edge 14 from radially inside to radially outside, in particular in the direction toward the cutting corner 32.

The angle $\beta1$, which is measured in the section along Line C-C, is in particular greater than the angle $\beta2$, which is measured in the section along Line D-D.

As can be seen from the previous description, there are various ways of measuring the flank angle. In any case, the flank angle increases from radially inside to radially outside.

The invention claimed is:

1. A cutting tool for the rotary machining of workpieces comprising:
    a cutting tip which has at least one main cutting edge and at least one free surface, wherein a flank face adjoins the main cutting edge radially outward from the main cutting edge and adjoins a guide bevel located on a peripheral surface of the cutting tool, wherein the main cutting edge merges into an edge of the flank face, and wherein a flank angle of the flank face, measured in a section perpendicular to the main cutting edge, continuously increases from the main cutting edge to a cutting corner to increase a clearance of the cutting tool during a machining operation, thereby reducing wear on the cutting tool.

2. The cutting tool according to claim 1, wherein the flank angle increases by at least 2°.

3. The cutting tool according to claim 1, wherein the flank angle increased by at least 4°.

4. The cutting tool according to claim 1, wherein the cutting tool comprises a back-milling, adjacent to the free surface, which opens into the flank face.

5. The cutting tool according to claim 1, wherein a corner radius extending between the cutting corner and the end point is not tangent to the at least one free surface.

6. The cutting tool according to claim 1, wherein the cutting tool is a twist drill.

7. A twist drill for the rotary machining of workpieces comprising:

a cutting tip having at least one main cutting edge and at least one free surface, wherein a flank face adjoins the main cutting edge radially outside the main cutting edge and a portion of the flank face is located on a peripheral surface of the twist drill, wherein the at least one main cutting edge merges into an edge of the flank face, and wherein a flank angle of the flank face, measured in a section perpendicular to the main cutting edge, continuously increases in a radially outward direction from the at least one main cutting edge to a cutting corner to increase a clearance of the twist drill during a machining operation, thereby reducing wear on the twist drill.

* * * * *